(12) United States Patent
Fant et al.

(10) Patent No.: US 6,304,730 B1
(45) Date of Patent: Oct. 16, 2001

(54) FILM CASSETTE HAVING AN INDICATION OF UNDEREXPOSURE

(75) Inventors: Alfred B. Fant; Kenneth L. Klassen, both of Rochester, NY (US); Paula Downing, Pinner (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/417,411

(22) Filed: Oct. 13, 1999

Related U.S. Application Data

(63) Continuation-in-part of application No. 09/302,137, filed on Apr. 29, 1999.

(51) Int. Cl.⁷ ........................... G03B 17/24; G03B 13/00; G03D 17/00
(52) U.S. Cl. .................... 396/311; 396/567; 396/512; 396/599
(58) Field of Search .................. 396/6, 311, 512, 396/516, 568–570, 599, 567; 382/254, 261, 263, 275; 355/38, 40, 41, 68, 77

(56) References Cited

U.S. PATENT DOCUMENTS

| | | | |
|---|---|---|---|
| 4,751,536 | 6/1988 | Ohmura et al. | 354/75 |
| 4,801,957 | 1/1989 | Vandemoere | 354/147 |
| 4,827,298 | 5/1989 | Sasaki et al. | 354/288 |
| 4,849,325 | 7/1989 | Sasaki et al. | 430/505 |
| 4,901,097 | 2/1990 | Vandemoere et al. | 354/295 |
| 5,323,204 * | 6/1994 | Wheeler et al. | 396/60 |
| 5,633,511 | 5/1997 | Lee et al. | 250/587 |
| 5,819,126 | 10/1998 | Kitagawa et al. | 396/319 |
| 5,822,453 | 10/1998 | Lee et al. | 382/169 |
| 5,826,112 | 10/1998 | Matsushita | 396/6 |
| 5,866,312 | 2/1999 | Wang et al. | 430/512 |
| 6,104,877 * | 8/2000 | Smart et al. | 396/6 |

* cited by examiner

Primary Examiner—D. Rutledge
(74) Attorney, Agent, or Firm—David M. Woods

(57) ABSTRACT

A cassette includes a photographic element having a predetermined ISO rating suitable for capturing a plurality of images thereon and identification based on an ISO greater than the predetermined ISO rating. The identification specifically indicates that the photographic element is underexposed and, when developed, is to be processed and printed by a digital print station to correct for the underexposure.

22 Claims, 2 Drawing Sheets

FILM CASSETTE HAVING AN INDICATION OF UNDEREXPOSURE

CROSS REFERENCE TO RELATED APPLICATIONS

This is a continuation-in-part of application Ser. No. 09/302,137 field Apr. 29 1999, entitled "A Film Cartridge" by Alfred B. Fant, Kenneth L.

Klassen and Paula Downing.

FIELD OF THE INVENTION

The present invention relates to a film cassette and, more specifically, to a film cassette having a barcode thereon for indicating that the film is intentionally underexposed.

BACKGROUND OF THE INVENTION

In traditional photography, it is customary to determine the light capturing ability of a film, or its photographic speed, through the method defined in ISO 5800 "Color Negative Films for Still Photography-Determination of ISO Speed". The method contained therein ensures that films exposed to the calculated amount of light will have the manufacturer's intended contrast over the entire scene luminance range. Films with the ability to be exposed with lower amounts of light are referred to as "faster" and have higher calculated speed values; those requiring more light are referred to as "slower" and have lower calculated speed. For each doubling of the requisite light, the calculated speed is decreased by one half. A film that has one-half the ISO calculated speed of a second film is said to be "one stop" slower than the second film; a film that has one-fourth the calculated speed of a second film is said to be "two stops" slower than the second film.

The method defined in ISO 5800 ensures that exposures made with one-half the intended amount of light will also have acceptable contrast in the resulting print when printed under the same conditions. This so-called underexposure latitude is required because of error in exposure determination by cameras and exposure meters, and because optical printing methods for color negative films do not allow for contrast adjustment of individual exposures. When a negative is exposed to less than one-half the intended amount of light, the film is underexposed, and the resulting print has low contrast; that is, there is not sufficient density range in the negative to produce a print with the desired density range.

The ability to record images with low amounts of light is of increasing importance to consumers. In many situations, the use of artificial lighting, such as floodlight or flashbulbs is not permitted or practical. Moreover, as ISO speed increases, print graininess increases, manufacturing cost increases, and other characteristics, such as color intensity, color accuracy and sharpness generally decrease.

Consequently, a need exists for a photographic method that allows for a low cost, high quality film to be exposed at higher than the intended ISO speed and yield acceptable print results.

SUMMARY OF THE INVENTION

The present invention is directed to overcoming one or more of the problems set forth above. Briefly summarized, according to one aspect of the present invention, the invention resides in a film cassette comprising: (a) a film for capturing a plurality of images thereon; and (b) an identification for specifically indicating that the film, when developed, is to be contrast adjusted by a digital print station.

An object of this invention is to provide a method which allows a photographic element to be exposed at higher than its calculated ISO speed and produce a photographic print with excellent contrast and graininess.

The invention provides a photographic element packaged for at least twice its rated ISO speed and identified for use with digital printing methods.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

For purposes of this invention, the term cassette shall refer to any light tight container designed to introduce a photographic element into a camera, and allow removal of the exposed photographic element from a camera without damage to the element. Terms such as cartridge and magazine are to be included in the use of the term cassette. Also in the following description, it is to be understood that such terms as "forward," "rearward," "left," "right," "upwardly," "downwardly," and the like are words of convenience and are not to be constructed as limiting terms.

A portion of the present invention is disclosed as being embodied preferably in a still photographic camera. Because the features of this type of camera are generally well known, the description which follows is directed in particular to elements forming part of or cooperating directly with the disclosed embodiment. It is to be understood, however, that other elements not specifically shown or described may take various forms known to persons ordinarily skilled in the art. The preferred embodiment contained herein refers to components generally found in the Advanced Photo System (APS) introduced by Eastman Kodak Company. Those ordinarily skilled in the art will see analogous applications in the 135 photographic system.

The present invention is also directed to a single use camera (using either APS or 135 film) having a photographic element incorporated therein.

Single use cameras are known in the art under various names: film with lens, photosensitive material package unit, box camera and photographic film package. Other names are also used, but regardless of the name, each shares a number of common characteristics. Each is essentially a photographic product (camera) provided with an exposure function and preloaded with a photographic material.

The photographic product comprises an inner container, e.g., a camera shell, loaded with the photographic material, a lens opening and lens, and an outer wrapping(s) of some sort. The photographic materials are exposed in camera, and then the product is sent to the developer who removes the photographic material and develops it. Return of the single use camera product to the consumer does not normally occur. Single use camera and their methods of manufacture and use are described in U.S. Pat. Nos. 4,801,957; 4,901,097; 4,849,325; 4,751,536; 4,827,298.

Figure 1:
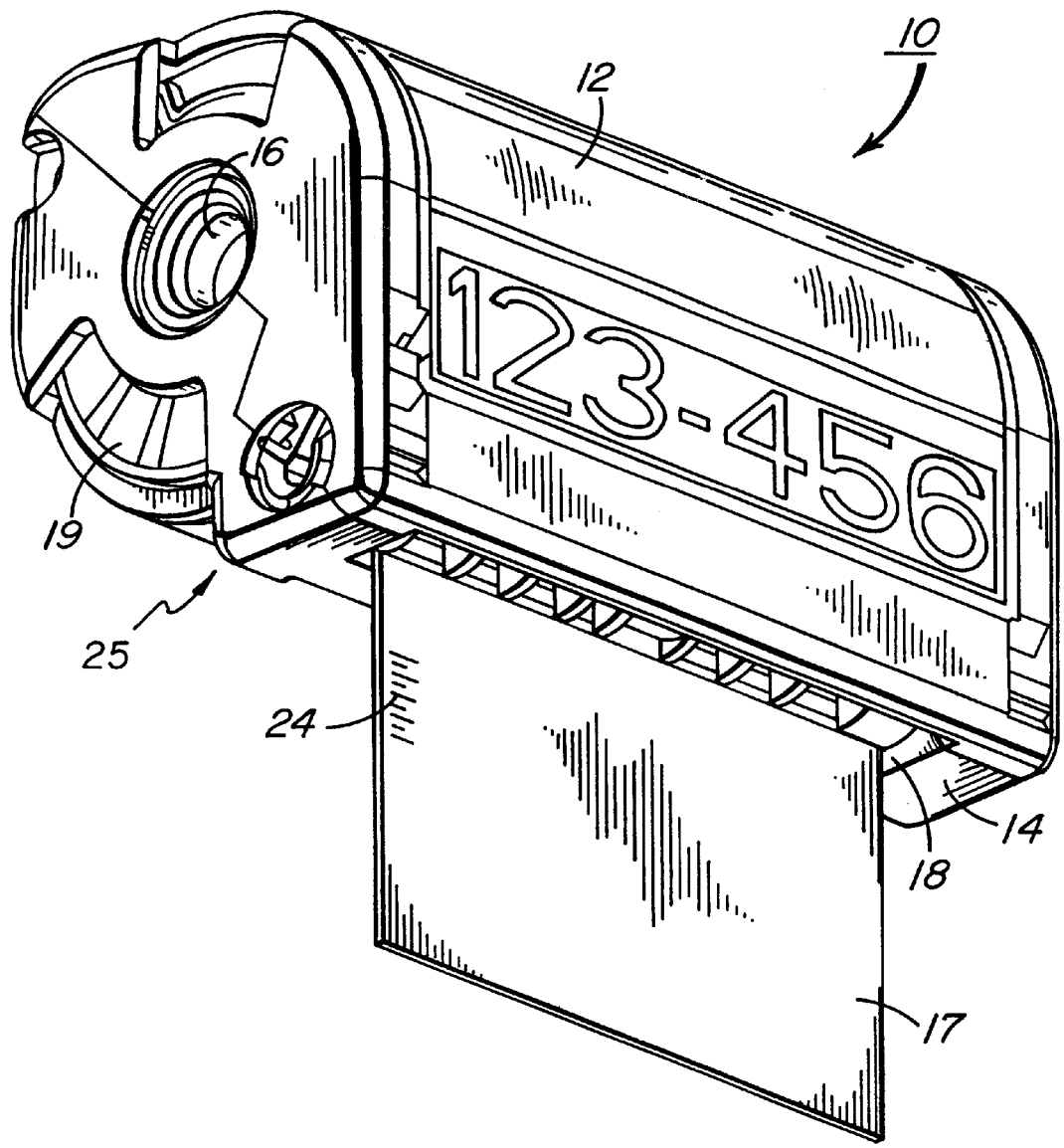
FIG. 1 is a perspective view of a film cassette of the present invention.

Referring now to the drawings, FIG. 1 shows a film cassette generally designated by the reference numeral 10.

The film cassette is preferably made of a material such as plastic and includes a housing 12 having a lip 14. A spool 16 is rotatably mounted inside the housing. Wrapped on the spool is a photographic filmstrip 17 which can be thrust through an opening 18 in the lip 14. A data disk 19 contains the ISO speed information for the film and conveys the speed information to the camera so it can set exposure time and aperture for the ISO speed. The data disk 19 may also communicate with equipment such as high speed automatic splicers to permit segregation of the film for subsequent digital printing.

The film includes a latent image barcode 24 thereon for indicating that the film is intentionally underexposed. Such exposure information may be contained within the unique film identification number currently imprinted on films using the DX system as defined in ANSI/NAPM IT 1.14-1997. It facilitates understanding to note that the exposing, or usage, speed of the film is one to three stops higher, preferably two, than its ISO rating. The film 17 is one speed, for example ISO 200, but the barcode 24 and data disc 19 are encoded with a higher film speed, for example ISO 800. The film 17 is intentionally underexposed so that a digital minilab, described in detail hereinbelow, may perform contrast adjustment on the digital representations of the images so that the hardcopy images are printed as if film with the rated ISO speed were used for the exposure. In an alternative embodiment, a barcode 25 is disposed on the film cassette 10, e.g., on the housing 12 or the data disk 19, for indicating the apparent speed of the film.

Figure 2:
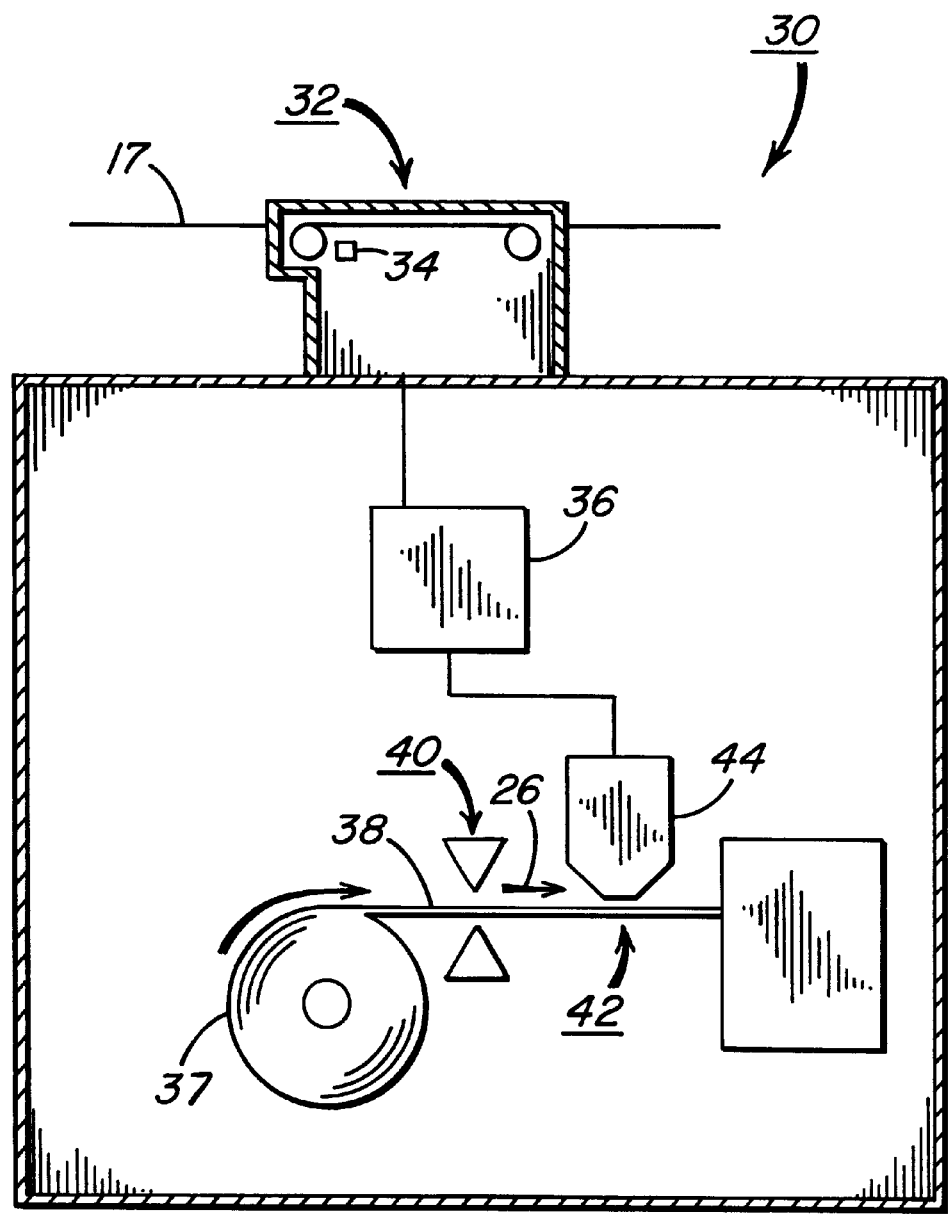
FIG. 2 is a schematic diagram of a typical digital print station for processing film of the present invention.

Referring to FIG. 2, there is illustrated a digital minilab 30 for processing and printing the exposed film 17. Processing of the latent image may be through any of the processing steps described in U.S. Pat. No. 5,866,312, which is incorporated herein by reference. The minilab 30 includes a scanner 32, which is designed to receive and scan a roll of developed film 17. The roll of developed film 17 is transported past a sensor 34 that scans the images on the film 17 so as to provide a digital record of the customer images. The sensor 34 also scans the barcode 24 on the film 17 which provides a digital record identifying the film 17, including its apparent speed. The digital record of the image is forwarded to an image data manager (IDM) 36 wherein the images are manipulated, as will be described in detail hereinbelow. In the embodiment illustrated, the IDM 36 includes a computer (microprocessor) used for manipulation of the digital images contained in the digital record file. The IDM 36 may also include a memory for storing the digital record of the customer image order. The IDM 36 is also programmed so that when the film 17 is received it initiates contrast adjustment as needed for each image contained on that particular roll of film. Because each image is corrected as needed, the overall print quality for the entire customer order is improved.

In one embodiment, the apparatus 30 further includes a supply roll 37 containing a web of photosensitive media 38, which in the present invention comprises photographic paper. A cutting mechanism 40 is provided for cutting the web of photosensitive media into individual cut sheets. The mechanism 40 may cut the web into sheets having any desired lengths. Appropriate transport mechanisms, not shown, are provided for advancing of the cut sheets in the direction indicated by arrow 26 through apparatus 30. In particular, the cut sheets are transported from cutting mechanism 40 to an exposure gate 42 where a digital printer 44 exposes the individual images of the customer image order onto individual cut sheets, respectively, as they pass through the exposure gate 42. In the particular embodiment illustrated, the digital printer 44 is a MLVA (Micro Light Valve Array) printer which scans a light containing image data onto cut sheets as they move in the direction indicated by the arrow past the exposure gate 42. Since the printer 44 is a digital printer and the cutting mechanism 40 may cut the web of photosensitive media 38 into any desired length cut sheets, the images produced on the cut sheets may be provided in a variety of different format sizes. The printing capabilities are only constrained by the printing capabilities of the printer 44 and width of the web of the photosensitive media 38.

It is also to be understood that the printer 44 may be any appropriate digital printer, for example, a CRT printer, LED printer, LCD printer, laser printer, or other type of digital printer that can print onto a photosensitive media. In the embodiment illustrated, the web of photosensitive media 38 comprises photographic paper; however, the media may comprise other media capable of being printed on by a digital printer. In the embodiment illustrated, the web of photosensitive media is first cut into individual cut sheets prior to printing, but the present invention is not so limited. The digital images may be first printed on the web of photosensitive media 38, which at some later time before or after processing, is to be cut into individual cut sheets forming individual prints, each print being representative of a print of a single customer image. In an alternative embodiment, apparatus 30 and photosensitive media 38 may be replaced by direct printing methods such as inkjet, thermal, or xerographic.

It is instructive to note that the IDM 36 includes a software program that performs contrast adjustment on the digital images. As previously stated, this program is initiated when the film barcode is received by the IDM 36. The software may be that as disclosed in either U.S. Pat. Nos. 5,822,453 or 5,633,511, which are incorporated herein by reference, or any other suitable contrast adjustment program. The contrast adjustment preferably modifies the digital images so that the printed-hardcopy images will appear as if exposed at the proper ISO. It should also be noted that while this embodiment describes a digital minilab, the same film recognition, film processing and image modifications are possible with larger scale photofinishing apparatus, similarly equipped. In another embodiment, the digital record file produced by IDM 36 may be directed to, and stored on, any computer readable storage medium, for example; magnetic storage media such as a magnetic disk (e.g., a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

In the aforementioned alternative embodiment, the barcode 25 indicating the apparent speed of the film is disposed on the film cassette 10 or, in the case of a single use camera, on the inner camera shell or similar storage component containing the film. In this embodiment, the cassette 10 or the inner camera shell is scanned by any suitable scanner before the exposed film 17 is developed by the digital minilab 30. This scanned information is input into the IDM 36 in the digital minilab 30 which will, in turn, initiate the contrast adjustment for that particular roll of film.

In another alternative embodiment, a box in which the film cassette 10 may be placed for retail purposes may also include, in addition to or in place of the barcode 24 on the film 17, a barcode on the box for indicating the apparent speed of the film 17. In this embodiment, the box is scanned by any suitable scanner before the exposed film 17 is developed by the digital minilab 30. This scanned information is input into the IDM 36 in the digital minilab 30 which will, in turn, initiate the contrast adjustment for that particular roll of film. In another embodiment, the box is a single use camera. The barcode on the single use camera is likewise scanned and input into the digital minilab 30.

The invention has been described with reference to a preferred embodiment. However, it will be appreciated that variations and modifications can be effected by a person of ordinary skill in the art without departing from the scope of the invention.

PARTS LIST film cassette
housing
lip
spool
photographic film
opening
data disk
latent image barcode
cassette barcode
arrow
digital minilab
scanner
sensor
image data manager (IDM)
supply roll
photosensitive media
cutting mechanism
exposure gate
digital printer

What is claimed is:

1. A cassette comprising:
   (a) a photographic element having a predetermined ISO rating suitable for capturing a plurality of images thereon; and
   (b) identification based on an ISO greater than the predetermined ISO rating for specifically indicating that the photographic element is underexposed and, when developed, is to be processed and printed by a digital print station to correct for the underexposure.

2. The cassette as in claim 1, wherein the identification is a barcode.

3. The cassette as in claim 2, wherein the barcode is placed on at least one of the photographic element or the cassette.

4. The cassette as in claim 1, wherein the identification includes an ISO speed rating for exposing the photographic element at an ISO speed that is at least twice the ISO speed of the photographic element.

5. A camera including a box comprising:
   (a) a container disposed within the box;
   (b) a photographic element having a predetermined ISO rating disposed in the container for capturing a plurality of images;
   (c) identification based on an ISO greater than the predetermined ISO rating for indicating that the photographic element is underexposed and, when developed, is to be contrast adjusted by a digital print station.

6. The camera as in claim 5, wherein the identification is a barcode.

7. The camera as in claim 5 where the identification is placed on the container.

8. The camera as in claim 5 wherein the identification is placed on the photographic element.

9. The camera as in claim 5 wherein the identification is placed on the box.

10. The camera as in claim 5 wherein the camera is a single use camera.

11. A method for digitally printing hardcopy images on a digital print station, the method comprising the steps of:
    (a) receiving a container having an exposed photographic element therein of a predetermined ISO rating;
    (b) receiving identification based on an ISO greater than the predetermined ISO rating specifically indicating that the exposed element was underexposed and, when developed, is to be contrast adjusted;
    (c) performing contrast adjustment on a digital representation of images on the element; and
    (d) printing a hardcopy of at least one of the images having the contrast adjustment.

12. The method as in claim 11, wherein step (a) includes receiving a film cassette with a barcode as the identification.

13. The method as in claim 12, wherein step (b) includes receiving bar code identification from either the element or the cassette.

14. The method as in claim 11, wherein step (b) includes receiving the identification from the container that contains the photographic element.

15. The method as in claim 14, wherein the container is a single use camera.

16. A photographic container comprising:
    (a) a photographic element having a predetermined ISO rating suitable for capturing a plurality of images thereon within a predetermined exposure latitude, and
    (b) identification based on an ISO difference greater than the predetermined exposure latitude and specifically indicating that the photographic element is intentionally exposed outside of the predetermined exposure latitude and, when developed, is to be processed to correct for the intentional exposure outside of the predetermined exposure latitude.

17. The photographic container as in claim 16, wherein the identification is a barcode.

18. The photographic container as in claim 17, wherein the barcode is placed on at least one of the photographic element or the container.

19. The photographic container as in claim 16 wherein the container is a film cassette.

20. The photographic container as in claim 16 wherein the container is a single use camera.

21. The photographic container as in claim 16 wherein the identification based on an ISO difference greater than the predetermined exposure latitude is used for setting exposure conditions in a photographic element exposure device that produces the intentional exposures.

22. The photographic container as in claim 16 wherein the exposure latitude is an underexposure latitude at least one stop under the predetermined ISO rating.

* * * * *